(12) United States Patent
Lentine et al.

(10) Patent No.: US 8,615,173 B1
(45) Date of Patent: Dec. 24, 2013

(54) SYSTEM FOR ACTIVE CONTROL OF INTEGRATED RESONANT OPTICAL DEVICE WAVELENGTH

(75) Inventors: Anthony L. Lentine, Albuquerque, NM (US); Michael R. Watts, Hingham, MA (US)

(73) Assignee: Sandia Corporation, Albuquerque, NM (US)

( * ) Notice: Subject to any disclaimer, the term of this patent is extended or adjusted under 35 U.S.C. 154(b) by 103 days.

(21) Appl. No.: 13/368,136

(22) Filed: Feb. 7, 2012

(51) Int. Cl.
*H04B 10/04* (2011.01)
*H04B 10/12* (2011.01)

(52) U.S. Cl.
USPC .......................... 398/198; 398/195; 398/182

(58) Field of Classification Search
None
See application file for complete search history.

(56) References Cited

U.S. PATENT DOCUMENTS

| | | | |
|---|---|---|---|
| 7,616,850 B1 | 11/2009 | Watts | |
| 7,977,622 B2 * | 7/2011 | McLaren et al. | 250/227.11 |
| 2005/0249509 A1 * | 11/2005 | Nagarajan et al. | 398/198 |
| 2007/0122148 A1 * | 5/2007 | Welch et al. | 398/27 |

OTHER PUBLICATIONS

Amberg et al, "A sub-400 fJ/bit thermal tuner for optical resonant ring modulators in 40 nm CMOS", Nov. 2012, IEEE Asian Solid-State Circuits Conference.*

DeRose, et al., "Silicon Microring Modulator with Integrated Heater and Temperature Sensor for Thermal Control", Optical Society of America, 2010.

\* cited by examiner

*Primary Examiner* — Leslie Pascal
*Assistant Examiner* — Casey Kretzer
(74) *Attorney, Agent, or Firm* — Martin I. Finston

(57) ABSTRACT

The present invention relates to an optical transmitter that includes an optical modulator configured to modulate an optical signal with a digital data stream, and a heater configured to apply heat to the optical modulator. The optical transmitter also includes an optical receiver configured to receive the modulated optical signal and to convert the modulated optical signal into a received digital data stream. A circuit is configured to compute bit errors in the received digital data stream by comparing the received digital data stream with the digital data stream, and control the heater based on the computed bit errors.

18 Claims, 5 Drawing Sheets

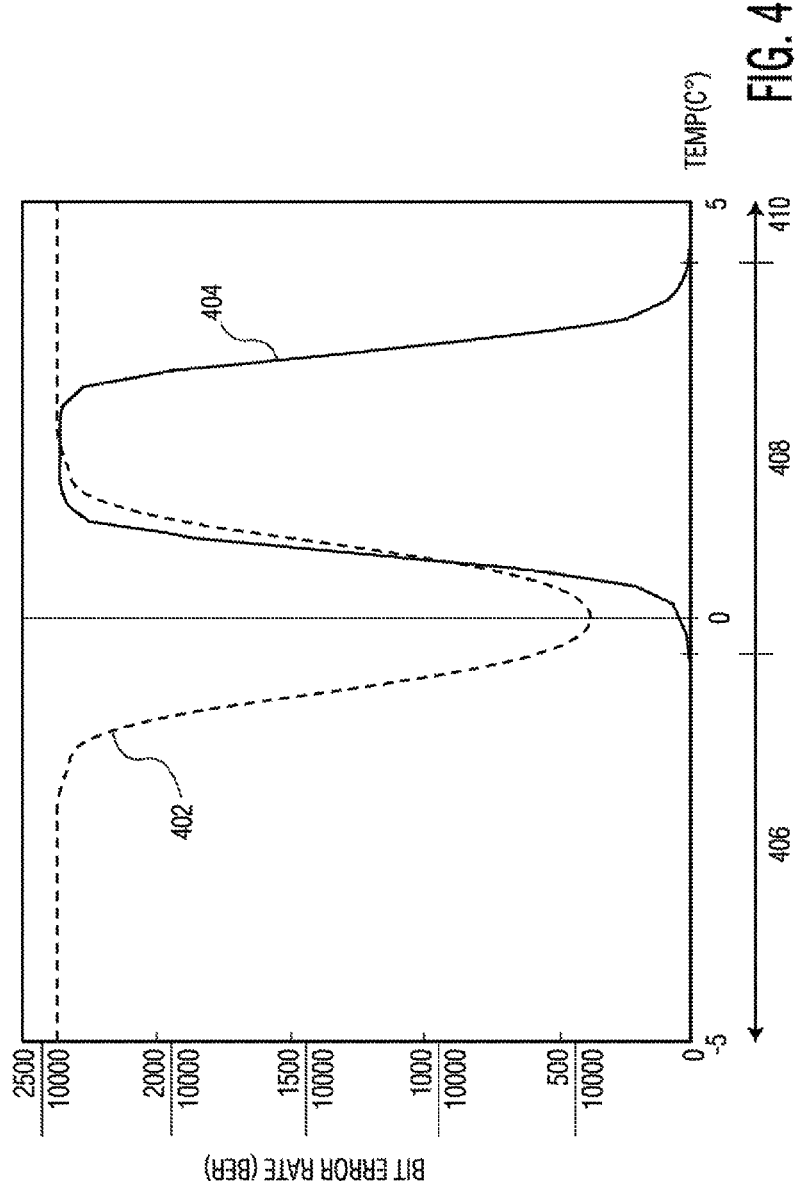

SYSTEM FOR ACTIVE CONTROL OF INTEGRATED RESONANT OPTICAL DEVICE WAVELENGTH

FIELD OF THE INVENTION

The present invention relates, in general, to an optical transmitter that modulates an optical signal based on a digital data stream. A heater is used to apply heat to an optical modulator in the transmitter.

BACKGROUND OF THE INVENTION

Previously implemented Silicon Photonic optical transmitters include an optical ring resonator modulator that modulates an incoming optical signal. The index of refraction within the ring changes with operating temperature which undesirably shifts the resonance. The index of refraction may also vary as a function of fabrication tolerances (e.g. dimensions of the ring). Some previous systems have implemented an integrated micro-heater that is controlled based on temperature readings from an integrated temperature sensor. In general, the micro-heater applies heat to the ring in an attempt to compensate for undesirable changes in the index of refraction based on the sensed temperature. However, these systems are limited due to the changing characteristics of the temperature sensor due to aging and other effects that degrade the bit error rate (BER) but do not affect the temperature.

SUMMARY OF THE INVENTION

The present invention relates to an optical transmitter that includes an optical modulator configured to modulate an optical signal with a digital data stream, and a heater configured to apply heat to the optical modulator. The optical transmitter also includes an optical receiver configured to receive the modulated optical signal and to convert the modulated optical signal into a received digital data stream. A circuit is configured to compute bit errors in the received digital data stream by comparing the received digital data stream with the digital data stream, and control the heater based on the computed bit errors.

BRIEF DESCRIPTION OF THE FIGURES

FIG. 4 is a plot of the logic 0 and logic 1 bit error rate (BER) computed by the optical transmitter, according to an embodiment of the present invention.

DETAILED DESCRIPTION

As will be described, the present invention provides a system and method for actively controlling the resonance wavelength of a resonant optical device. In one example, an optical transmitter may include a resonant optical device such as an optical ring resonator having multiple light ports (e.g. a thru port and a drop port). A continuous wave (CW) light signal such as a laser beam may be input to the optical ring resonator where it is digitally modulated when voltage applied to the ring.

In one embodiment, the optical transmitter includes an optical receiver for converting the modulated optical signal into an electrical signal. The optical transmitter includes circuitry that may include dedicated analog/digital circuits and/or a processor that performs error detection and outputs a control signal to a heater for heating the optical modulator based on the detected errors.

Figure 1:
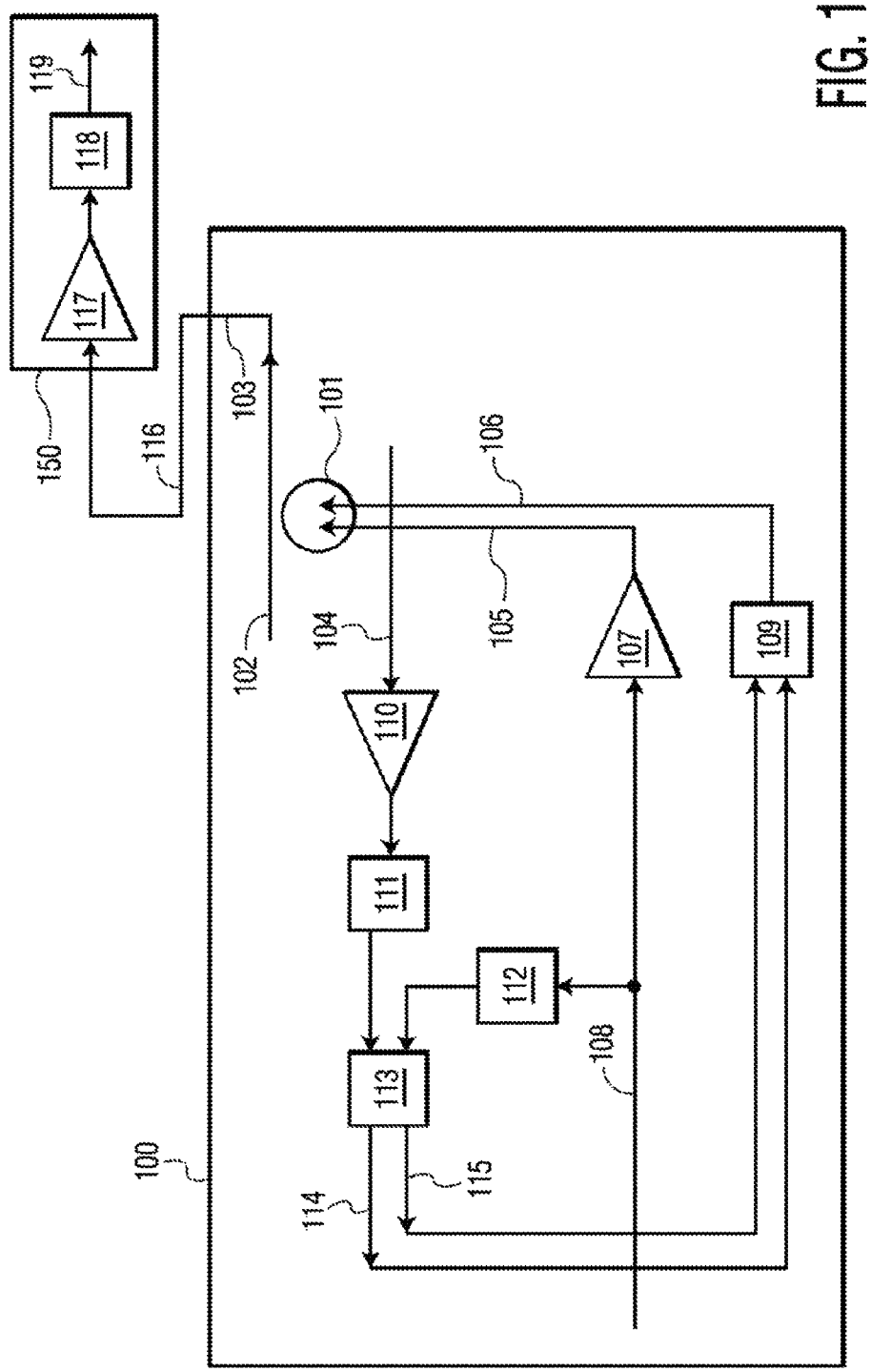
FIG. 1 is a block diagram of an optical transmitter and an optical receiver, according to an embodiment of the present invention.

Shown in FIG. 1 is a block diagram of an optical transmitter 100 that is transmitting an optical signal (e.g. a modulated laser beam) over optical link 116 to receiver 150. It should be noted that receiver 150 may be on the same chip or may be off chip from optical transmitter 100.

In this embodiment, optical transmitter 100 may include an optical signal (e.g. a laser beam) that is generated by a laser device (not shown) and provides the optical signal to optical modulator 101 where it is modulated (e.g. digitally to transmit logic 1's and 0's). In one example, optical modulator 101 may be an optical ring resonator that includes a thru port 103, drop port 104 and a heater 34 (not shown).

Optical transmitter 100 also includes optical receiver 110, digital logic decision circuit 111, delay circuit 112, error detector 113, error lines 114 and 115, transmission data line 108, amplifier 107, controller 109, modulation control line 105, and heater control line 106.

During operation, laser beam 102 is optically modulated (e.g. digitally) by optical modulator 101. In general, digital data 108 is amplified (at amplifier 107) and then a voltage is applied (via control line 105) to optical ring modulator 101. By applying a voltage to the optical ring modulator, the light intensities through ports 103 and 104 may be controlled (e.g. complementary to each other). Thus, as the laser light intensity passing through port 103 is increased, the laser light intensity passing through port 104 is decreased (and vice versa).

The modulation may be a result of the index of refraction of the modulator changing as a function of the changing carrier concentration in the device (i.e. the applied voltage to the modulator changes the index of refraction). It is noted that controlling the temperature of the modulator based on bit errors is not limited to a specific modulation method (i.e. the bit error based control method is applicable to a variety of modulation methods that may be used in conjunction with a variety of resonant modulators).

In general, the modulated laser beam being transmitted over thru port 103 is transmitted over optical link 116 and received at receiver 150. The modulated optical signal is then demodulated by optical receiver 117 and a decision is made on whether it is a transmitted logic 1 or a logic 0 at detector 118. The digital bits are then output over line 119 to another circuit (not shown). It is also contemplated that detector 118 may include error correction to correct transmission errors.

As described above, the operating temperature of the optical micro-ring modulator shifts the resonant wavelength. In operation, in order to compensate for this shift, optical transmitter 100 detects transmission errors in the modulated optical signal over drop port 104 and then applies appropriate control voltage to the heater (i.e., to either heat up or cool down modulator 101).

For example, modulated signal in drop port 104 is converted by receiver 110 into an electrical signal. Circuit 111 then determines if the transmitted signal is logic 1 or a logic 0. Error detection circuit 113 then compares the received digital data stream with a delay compensated version of the original transmission data 108, to determine if the transmitted bits and received bits are the same. Error detection circuit 113 is then able to determine if a logic 0 error or a logic 1 error has occurred during optical transmission. The logic 1 errors are transmitted to controller 109 via line 114 whereas the logic 0 errors are transmitted over line 115 to controller 109. Controller 109 then applies a voltage (over control line 106) to the optical modulator heater (not shown).

Logic 1 errors absent logic 0 errors typically mean that the operating temperature is too cold, whereas a mix of logic 1 and logic 0 errors typically means that the operating temperature is too hot (see FIG. 4). In one example, for every logic 0 error, a negative electrical pulse may be generated and applied to a proportional integral derivative (PID) controller (not shown) included in controller 109. For every logic 1 error, a positive electrical pulse may be generated and applied to the PID controller. In response to receiving the negative pulses and positive pulses, the PID controller either decreases or increases a voltage applied to the resistive heater (i.e. decreases or increases the heat applied to the ring).

Thus, in this example, when a logic 0 error occurs, the PID controller (in response to receiving a negative pulse) decreases the voltage applied to the heater to decrease the temperature of optical resonator 101 (i.e. cool it down). In contrast, when a logic 1 error occurs, the PID controller (in response to receiving a positive pulse) increases the voltage applied to the heater to increase the temperature of optical resonator 101 (i.e. heat it up).

In one example, the amplitude of the negative electrical pulses is set to be larger than the amplitude of the positive electrical pulses in order to counteract a scenario where both logic 1 and logic 0 errors occur at similar rates. This example will be further described with respect to FIG. 4.

Figure 2A:
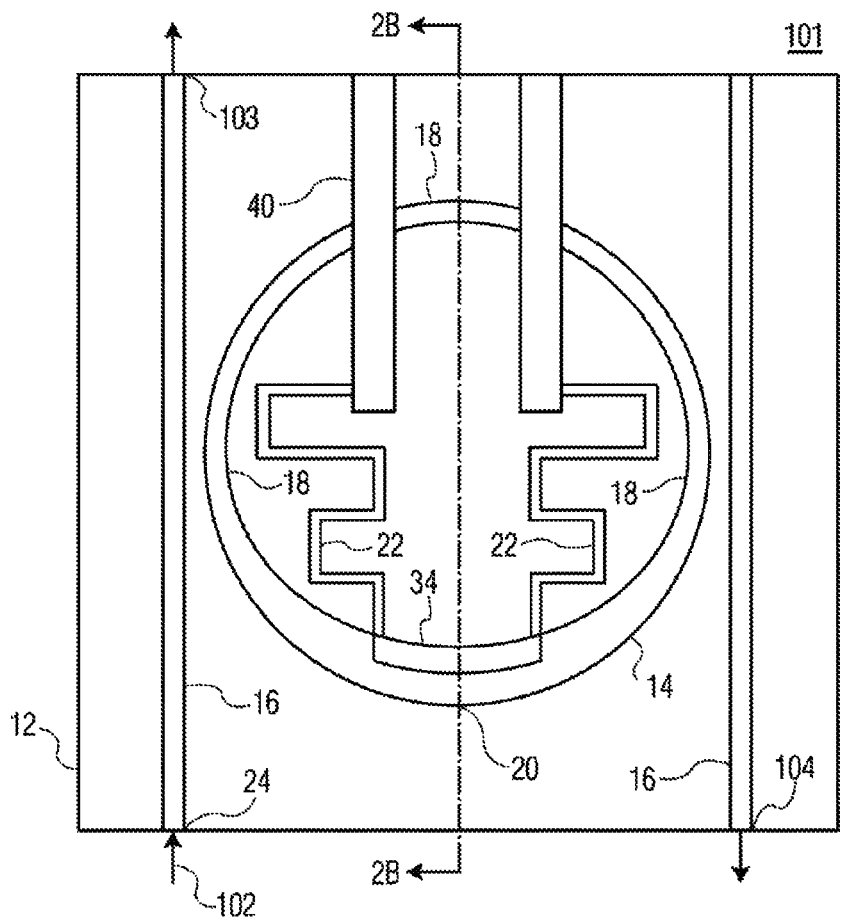
FIG. 2A is schematic plan view of an optical ring modulator, according to an embodiment of the present invention.

FIG. 2A shows the details of an example optical modulator 101. Specifically, an optical waveguide ring 14 is supported on a substrate 12 with a pair of optical waveguides 16 evanescently coupled to optical waveguide ring 14 in a location near minimum width 18. In this embodiment, the optical waveguide ring 14 has a width that is adiabatically increasing to a maximum width 20.

An electrical heater 34 is also located in optical waveguide ring 14 proximate to the location of maximum width 20. In one embodiment, electrical heater 34 may comprise an impurity doped region when the optical waveguide ring 14 is formed from monocrystalline silicon. The impurity doped region may be a region in the monocrystalline silicon which has been doped with specific doping concentration (e.g. with an impurity such as boron, phosphorus or arsenic). This would make the impurity doped region electrically resistive. When a voltage is applied over opposite ends of electrical heater 34, the impurity doped region begins to heat ring 14. In general this changes the index of refraction (i.e. the wavelength) via a thermo-optic effect so that the effective optical path for light 100' circulating around optical waveguide ring 14 is increased (see i.e. this changes the resonant frequency of light 100' in ring 14).

In general, electrical power may be supplied to heater 34 through a pair of connecting members 22 which act as electrical contacts. Wiring 40, which connects to contracts 22 may be connected to heater control line 106 that is connected to controller 109 shown in FIG. 1 (e.g. controller 109 applies the electrical current to the heater through control line 106).

Thus, laser beam 102 enters waveguide 16 at port 24 and travels to thru port 103. The laser beam 102 is also optically coupled through the ring modulator to output through drop port 104 (i.e. the ring optically couples to waveguides 16 when a modulating voltage is applied).

For example, if a modulating voltage is not applied to ring 14, then laser beam 100 will pass directly through waveguide 16 and exit port 103 (i.e., logic 1 will be transmitted over the thru port). If a voltage is applied to ring modulator 14, the intensity of the laser beam will be redirected through the ring and into waveguide 16 and exit through drop port 104 (i.e., the logic 1 signal will be output through the drop port). Thus, in this embodiment, the through port and the drop port 26 have a complementary relationship.

Figure 2B:
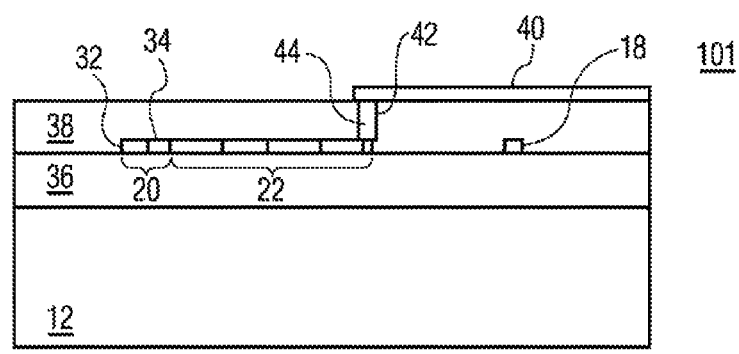
FIG. 2B is a schematic cross-section view of the optical ring modulator shown in FIG. 2A along section line 2-2, according to an embodiment of the present invention.

As shown in FIG. 2B, optical ring 14 and waveguide 16 may be supported above substrate 12 on layer 36. Layer 36 may include the various elements 14, 16, 22, and 34 which are formed on a monocrystalline silicon layer of the substrate. Second layer 38 may be deposited over optical ring 14 and optical waveguide 16. This may be useful for encapsulating elements 14, 16, 22 and 34 and to provide support for wiring 40.

Figure 3A:
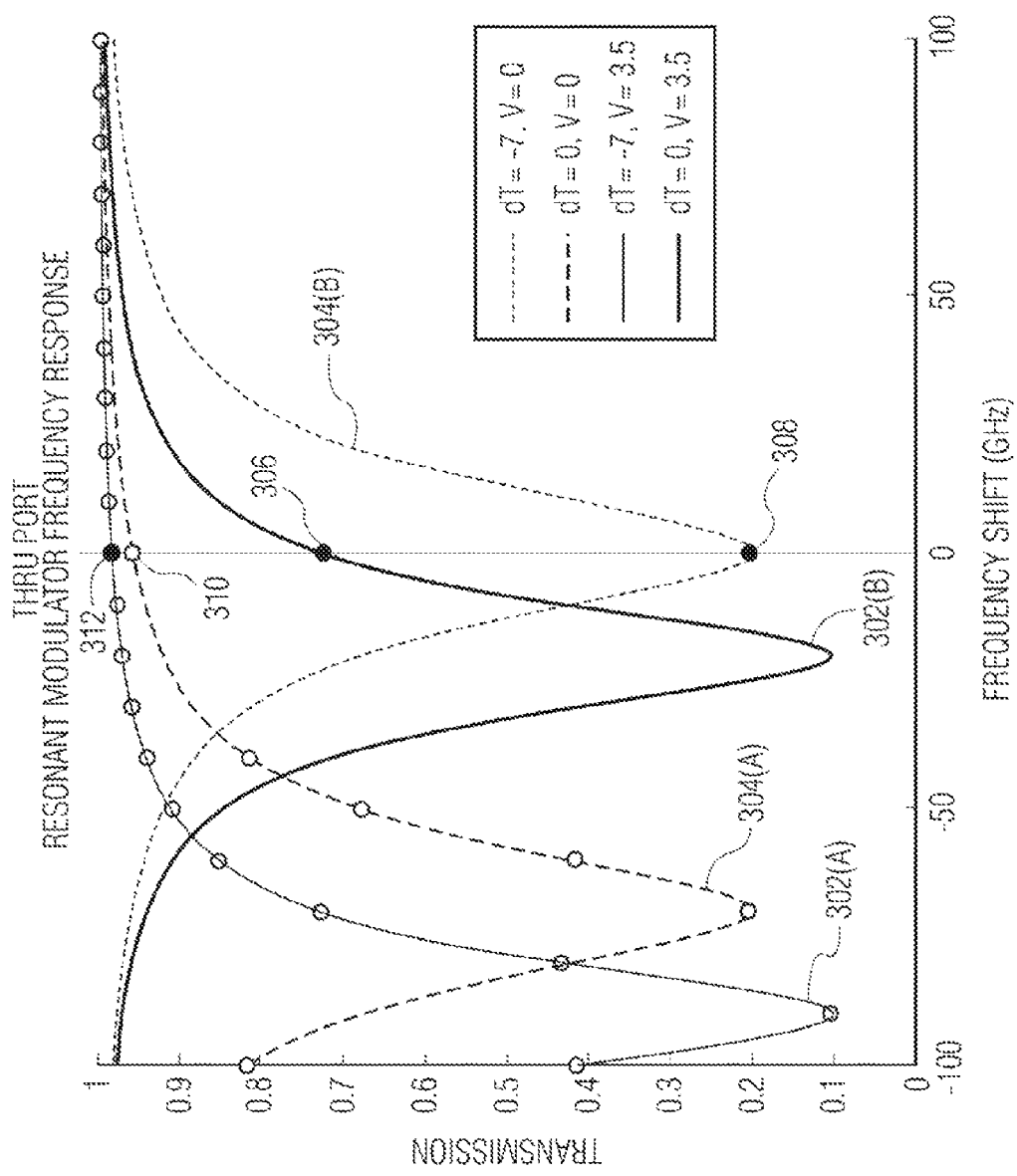
FIG. 3A is a plot of the optical ring modulator frequency response for the thru port, according to an embodiment of the present invention.

As described in FIG. 2A, when voltage is applied to optical ring 14, laser beam 102 passing through waveguide 16 is either modulated to pass over thru port 103 or drop port 104 (i.e., the intensity of the light is amplitude modulated based on the voltage applied to the ring). This amplitude modulation is shown in FIG. 3A for the thru port 103.

It is noted that although an optical ring is described above as the modulator in this example, that the micro-heater may also be incorporated into other micro-resonant devices of different configurations (e.g. a micro-disk modulator). Controlling the temperature of these other micro-resonant devices based on bit errors would be similar to the ring modulator.

Curve 302(A) and curve 304(A) are the optical frequency responses of the modulator passing through the thru port 103 when 3.5 volts (e.g. a logic 1) and 0 volts (e.g. a logic 0) respectively are applied to the modulator. Curves 302(A) and 304(A) may be shifted in frequency from their desired characteristics due to operating temperature and/or fabrication errors in the optical modulator. In this example, with the input laser wavelength at the frequency shift threshold of 0 GHz, a logic 1 and a logic 0 transmission have similar amplitudes 312 and 310 that may be difficult to distinguish at the receiver (i.e. the amplitudes between the different modulated signals are too close to one another).

In order to correct this undesired frequency shift of the modulator characteristics, in one embodiment, the heater applies heat to shift the frequency response of the modulator closer to its desired frequency (i.e. a frequency shift of 0 GHz). The shifted frequency response is shown by curves 302(B) and 304(B) when 3.5 volts (e.g. a logic 1) and 0 volts (e.g. a logic 0) are applied respectively to the modulator. When the modulator is operating at the proper temperature, the points where the two curves cross the 0 GHz frequency shift threshold 306 and 308 are sufficiently different from one another (i.e., it is easier to distinguish between the intensity of a logic 1 and a logic 0).

Figure 3B:
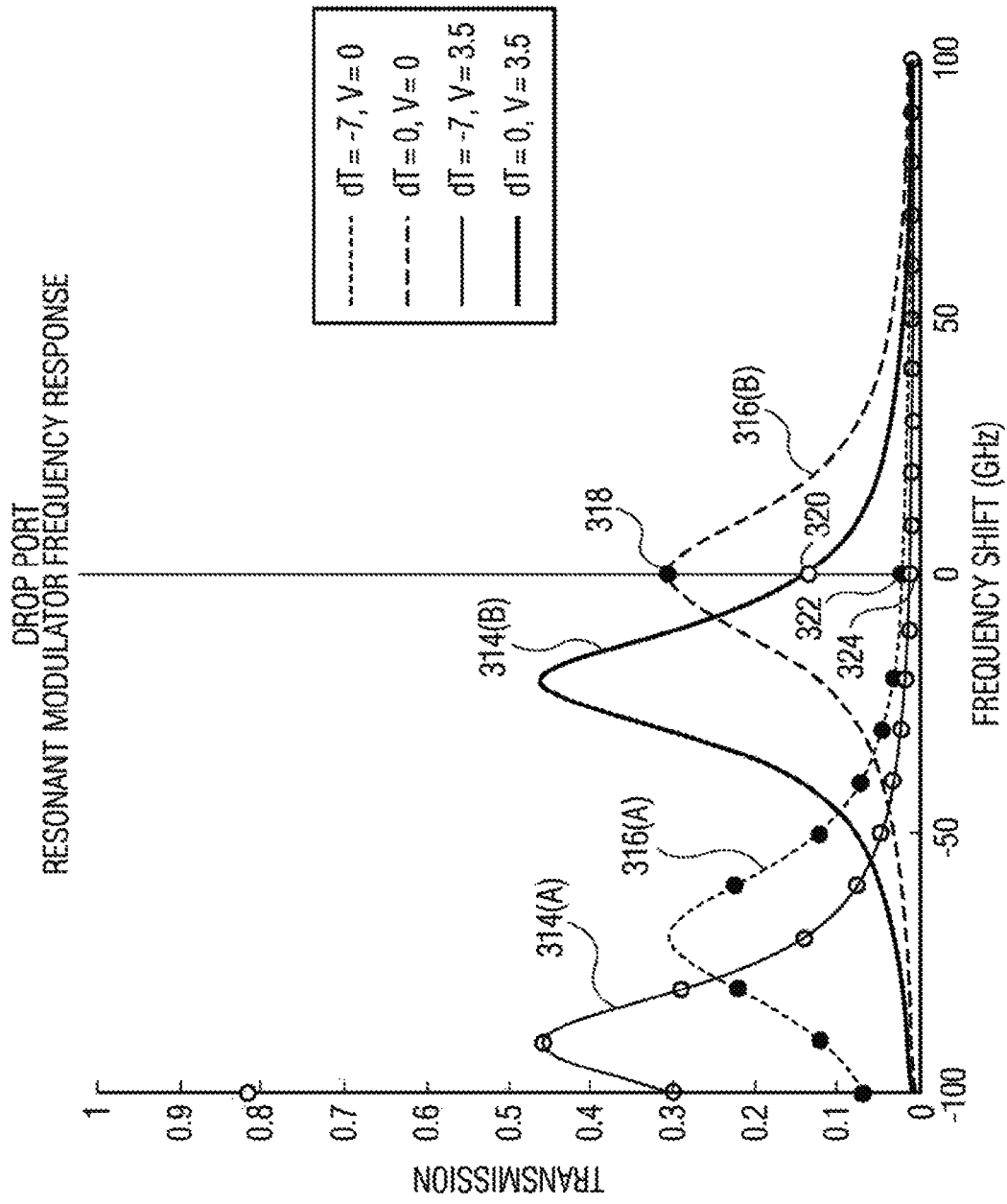
FIG. 3B is a plot of the optical ring modulator frequency response for the drop port, according to an embodiment of the present invention.

A similar scenario is shown in FIG. 3B for the drop port. Curves 314(A) and 316(A) (where 3.5 volts and 0 volts are applied to the modulator respectively), cross the frequency shift threshold of 0 GHz at points 322 and 324 which are hard to distinguish from each other (e.g. logic 0 and logic 1 transmissions have similar light intensities). As described above, this is due to shifts in the resonant wavelength of the modulator caused by operating temperature and/or fabrication tolerances of the modulator. In the example system, once the heater applies the appropriate amount of heat to the modulator based on the bit error rate, the curves shift to become curves 314(B) and 316(B) which cross the threshold at points 320 and 318 respectively (e.g. logic 0 and logic 1 transmissions have distinguishable light intensities).

In one example, the behavior of logic 0 errors and logic 1 errors are shown in FIG. 4 with respect to the operating temperature of optical modulator 101. At temperature shifts less than 0° C., the bit errors are primarily logic 1 errors as shown by graph 402. However, in this example, between temperature shifts of 0° C. and approximately 4° C., there is a mixture of logic 0 errors and logic 1 errors as shown by the overlapping of curves 402 and 404. Temperature shifts greater than 4° C. show that the errors are once again primarily logic 1 errors. Thus, in region 406, the errors are all logic 1 errors, in region 408, the logic errors are a mixture of logic 1 and 0 errors, and in region 410 the errors are all logic 1 errors.

Thus, when controller 109 receives all logic 1 errors (assuming the modulator is operating in region 406) a positive amplitude electrical pulse is applied to the PID controller which increases the voltage applied to the heater thereby increasing the temperature of the modulator in an attempt to shift the operating temperature closer to its target value (i.e. obtain a temperature shift close to 0° C.) in order to reduce the errors.

If, however, the system is operating in region 408 (i.e., there is a mixture of logic 0 and logic 1 errors), both positive and negative electrical pulses are applied to the PID controller in response to receiving both logic 1 and logic 0 errors. Since there is a mixture of both logic 1 and logic 0 errors, the negative electric pulse that decreases the temperature of the modulator may have a higher amplitude than the positive electrical pulses, otherwise the system may get stuck in region 408. For example, if both positive and negative pulses have the same unit amplitude, then for every logic 1 error, the temperature would increase and for every logic 0 error, the temperature would decrease, and therefore the temperature would get stuck in a region where the rate of logic 0 and logic 1 errors are similar.

By increasing the amplitude of the negative electrical pulse to be higher than the positive electrical pulse (e.g., positive electrical pulse may be 1 unit amplitude, whereas the negative electrical pulse may be 3 unit amplitudes), the PID controller will decrease the voltage applied to the heater for a logic 0 error more significantly than it will increase the voltage applied to the heater for a logic 1 error. Therefore, the system will not get stuck in region 408 where the logic 0 and logic 1 errors are equivalent.

It should also be noted that in FIG. 4, if all logic 1 errors are detected, the modulator may be operating in either region 406 or 410. A distinction between these two regions may be made in order to determine whether a negative or a positive electrical pulse should be applied to the heater. This distinction may be made based on the temperature of the modulator (i.e., a temperature-sensing device may be integrated into modulator 101) or by knowing that when the device initially starts up, the temperature is colder than it should be, and is initially operating in region 406.

In one example, receiver 110 may have higher noise characteristics than receiver 117 in order to generate errors that are used in the correction algorithm. This can be accomplished by designing a receiver with lower transimpedance than would otherwise be required. Other ways to produce more errors may include measuring error rates at multiple signal to noise ratio thresholds.

Optical receiver 117 may be off chip or on chip. Receiver 117 in general, may have a lower noise floor and perform essentially error-free when a modulator wavelength is optimized using the bit error rate corrections as described above. In other embodiments, both may be routed from the same port with a splitter routing part of the signal to each receiver. In another embodiment, bit error correction may be utilized at receiver 117.

In another embodiment, optical modulator 101 may include a cooling device such as a fan (not shown) or a thermoelectric cooler (not shown) that is also controlled by controller 109 to cool down the ring modulator more rapidly. The cooling device may be external to the modulator or may be micro-cooler that is integrated into the modulator structure similar to the heater.

In one example, when controller 109 wants to lower the temperature, the amplitude of the electrical signal applied to the heater may be reduced while the amplitude of the electrical signal applied to the cooler may be increased, therefore cooling down the modulator more rapidly. It should also be noted that a heat sink (not shown) may be coupled to the ring modulator through a thermal resistance (not shown) as a passive cooling device which radiates the heat away from the ring modulator more rapidly.

It should be noted that the electrical devices (e.g. 111, 112, 113, 107 and 109) within optical transmitter 100 may be implemented as dedicated hardware circuits (e.g. analog and/or digital circuits) that may include a field programmable gate array (FPGA) and/or a processor for implementing the method in software.

It should also be noted that other types of optical modulators having different geometries and different numbers of ports may also be controlled utilizing the error rate control algorithm described above. These include, without limitation, an electro-absorption modulator (EAM) and a Mach-Zehnder modulator. As described above, if the modulator does not have complementary outputs, a beam splitter may be used on the output port to route the modulated laser beam to the respective optical receivers 110 and 117, shown in FIG. 1.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An optical transmitter, including:
    an optical modulator configured to modulate an optical signal with a digital data stream;
    a heater configured to apply heat to the optical modulator;
    an optical receiver configured to receive the modulated optical signal and to convert the modulated optical signal into a received digital data stream; and
    a circuit configured to:
    compare the received digital data stream with a time delayed version of the digital data stream to compute logic 1 bit errors and logic 0 bit errors in the received digital data stream; and
    control the heater with control outputs based on individual computed bit errors, the circuit further configured such that computed logic 1 bit errors evoke different control outputs than computed logic 0 bit errors.

2. The optical transmitter of claim 1,
    wherein the optical modulator includes:
    an optical ring resonator or an optical disk resonator having an optical waveguide,
    a thru port waveguide evanescently coupled to the optical ring resonator, and
    a drop port waveguide evanescently coupled to the optical ring resonator.

3. The optical transmitter of claim 1,
wherein the heater includes a resistive portion that is coupled to electrodes of a power source controlled by the circuit.

4. The optical transmitter of claim 1,
wherein the circuit is configured to apply a voltage pulse to a controller for each detected bit error, said pulse having one value for a detected logic 0 bit error, and having a different value for a detected logic 1 bit error, and
wherein the controller decreases a voltage applied to the heater to decrease heat applied to the modulator in response to the negative pulse, and increases the voltage applied to the heater to increase heat applied to the modulator in response to the positive pulse.

5. The optical transmitter of claim 1,
wherein two non-overlapping operating temperature ranges, one higher than the other, are known to lead to predominantly logic 1 errors, and the circuit is configured to determine whether computed logic 1 errors are being produced by the modulator operating in the higher of said operating temperature ranges or in the lower of said ranges.

6. The optical transmitter of claim 2,
wherein the modulated optical signal is transmitted to the optical receiver through the drop port, and the modulated optical signal is transmitted to another destination optical receiver through the thru port, and
wherein the destination optical receiver has a lower noise floor than the optical receiver, or performs error correction.

7. A laser beam transmitter, including:
an optical ring modulator configured to modulate a laser beam with a digital data stream;
a heater configured to apply heat to the optical ring modulator;
an optical receiver configured to receive the modulated laser beam and to convert the modulated laser beam into a received digital data stream; and
a circuit configured to:
compute logic 1 bit errors and logic 0 bit errors in the received digital data stream by comparing the received digital data stream with the digital data stream, and
for at least some logic 1 bit errors, control the heater to increase the applied heat if a logic 1 bit error occurs, and control the heater to decrease the applied heat if a logic 0 bit error occurs.

8. The optical transmitter of claim 7,
wherein the optical ring modulator includes:
a thru port waveguide evanescently coupled to the optical ring modulator, and
a drop port waveguide evanescently coupled to the optical ring modulator;
wherein the circuit is configured to apply a voltage across the optical ring modulator to modulate the laser beam through the thru port and through the drop port based on the digital data stream, the thru port and drop port providing complementary digital outputs.

9. The optical transmitter of claim 7,
wherein the heater includes an impurity doped region of the optical modulator ring that is coupled to electrodes of a power source controlled by the circuit.

10. The optical transmitter of claim 7,
wherein the circuit includes a PID controller and is configured to apply a positive voltage pulse having a unit magnitude to the PID controller for a detected logic 1 bit error, and apply a negative voltage pulse having an integer multiple of the unit magnitude to the PID controller for a detected logic 0 bit error.

11. The optical transmitter of claim 7,
wherein two non-overlapping operating temperature ranges, one higher than the other, are known to lead to predominantly logic 1 errors, and the circuit is configured to determine whether computed logic 1 errors are being produced by the modulator operating in the higher or in the lower of said operating temperature ranges, and
wherein the circuit is configured to increase a voltage applied to the heater when it is determined that the logic 1 errors are being produced by the lower said range, and decrease the voltage applied to the heater when it is determined that the logic 1 errors are being produced by the higher said range.

12. The optical transmitter of claim 7,
wherein the modulated laser beam is transmitted to a destination optical receiver that receives and converts the modulated laser beam into a destination received digital data stream and performs bit error correction on the digital data stream.

13. The optical transmitter of claim 7,
wherein the modulated laser beam is transmitted to a destination optical receiver that receives and converts the modulated laser beam into a destination received digital data stream, and
wherein the destination optical receiver has a lower noise floor than the optical receiver in the laser beam transmitter.

14. A method for controlling an optical transmitter, comprising:
modulating, by an optical modulator, an optical signal with a digital data stream;
applying heat, by a heater, to the optical modulator;
receiving, by an optical receiver, the modulated optical signal;
converting, by the optical receiver, the modulated optical signal into a received digital data stream;
computing, by the circuit, logic 1 bit errors and logic 0 bit errors in the received digital data stream, and
applying, by the circuit, a first electrical signal to the heater to increase the applied heat for each of at least some logic 1 bit errors, and a second electrical signal to the heater to decrease the applied heat for every logic 0 bit error.

15. The method for controlling an optical transmitter of claim 14,
wherein the second electrical signal has a higher magnitude than the first electrical signal.

16. The method for controlling an optical transmitter of claim 14, further comprising:
determining, by the circuit, if the bit errors are all logic 1 errors,
determining, by the circuit, whether the temperature of the optical modulator lies in a first or in a second of two non-overlapping operating temperature ranges, one higher than the other, that are known to lead to predominantly logic 1 errors, and
applying, by the circuit, the first electrical signal to the heater when it is determined that all of the bit errors are logic 1 errors and the temperature is in the first said range, and the second electrical signal to the heater when it is determined that all of the bit errors are logic 1 errors and the temperature is in the second said range.

17. The method for controlling an optical transmitter of claim 14,
   wherein a thru port and a drop port of the optical transmitter provide respective, complementary digital outputs, one said digital output is transmitted to the optical receiver through the drop port, and the other said digital output is transmitted to a further optical receiver through the thru port.

18. The method for controlling an optical transmitter of claim 14,
   wherein the modulated optical signal is transmitted to the optical receiver and to another optical receiver through a common port that includes an optical splitter.

* * * * *